(12) United States Patent
Hewelt

(10) Patent No.: US 12,188,805 B2
(45) Date of Patent: Jan. 7, 2025

(54) CRYOGENIC FLUID MEASUREMENT

(71) Applicant: HewTech Electronics, LLC, China, MI (US)

(72) Inventor: Scott Hewelt, China, MI (US)

(73) Assignee: HewTech Electronics, LLC, China, MI (US)

( * ) Notice: Subject to any disclaimer, the term of this patent is extended or adjusted under 35 U.S.C. 154(b) by 1071 days.

(21) Appl. No.: 16/927,895

(22) Filed: Jul. 13, 2020

(65) Prior Publication Data

US 2022/0011148 A1   Jan. 13, 2022

(51) Int. Cl.
*G01F 23/18*   (2006.01)
*F17C 13/02*   (2006.01)

(52) U.S. Cl.
CPC ........ *G01F 23/18* (2013.01); *B01L 2300/025* (2013.01); *B01L 2300/06* (2013.01); *B01L 2300/0832* (2013.01); *B01L 2300/14* (2013.01); *F17C 13/02* (2013.01); *F17C 2250/0408* (2013.01)

(58) Field of Classification Search
CPC ........ G01F 23/14; G01F 23/16; G01F 23/162; G01F 23/164; G01F 23/165; G01F 23/167; G01F 23/168; G01F 23/18; G01F 23/185; F17C 2250/0408; F17C 2250/0413; F17C 2250/0417; F17C 13/021; F25B 2600/05; F25B 1700/04
See application file for complete search history.

(56) References Cited

U.S. PATENT DOCUMENTS

| | | | |
|---|---|---|---|
| 4,214,368 A | 7/1980 | Peterson | |
| 5,018,387 A * | 5/1991 | Myneni | G01F 23/18 73/299 |
| 6,467,343 B1 * | 10/2002 | Baird | G01F 23/164 73/290 R |
| 2004/0236536 A1 * | 11/2004 | Neeser | F17C 13/028 702/156 |
| 2015/0211913 A1 * | 7/2015 | Murphy | G01F 23/185 702/55 |
| 2016/0187179 A1 * | 6/2016 | Hrncir | G01F 23/268 73/304 C |

* cited by examiner

*Primary Examiner* — Herbert K Roberts
(74) *Attorney, Agent, or Firm* — Greenberg Traurig, LLP

(57) ABSTRACT

A device for measuring a cryogenic liquid level is disclosed. The device includes an inner cylindrical tube, an outer cylindrical tube that is coaxial with the inner cylindrical tube, the outer tube separated from the inner tube by an air gap, wherein the air gap is exposed to environmental pressure but sealed against cryogenic liquid, and a pressure transducer in pressure communication with the inner tube. The outer and inner tubes may be inserted into a cryogenic fluid chamber, and the depth of the cryogenic liquid may be determined based on the pressure present in the inner tube and detected by the pressure transducer.

20 Claims, 6 Drawing Sheets

CRYOGENIC FLUID MEASUREMENT

TECHNICAL FIELD

The instant disclosure relates to measurement of a cryogenic liquid level, such as cryogenic liquid stored in a type of vacuum insulated storage freezer (e.g., Dewar).

BACKGROUND

The standard technique for measuring a cryogenic liquid level in a container involves the use of a "dipstick". Conventional dipsticks consist of a solid tube, rod or flat stick. Typically, the dipstick is dipped into the vessel for 5-6 seconds, then removed and waved in the airspace of the room until an obvious frost-line develops approximately at the transition point between the liquid and gas vapor when the dipstick was submerged in the cryogenic liquid. The process is intentionally quick to reduce the time that an outside thermal mass is introduced into the cryogenic stable environment.

The "dipstick" must be a solid construction to function as described above because a hollow tube will quickly eject the liquid through the hollow portion of the tube, as the cryogenic liquid quickly expands during gasification, causing a stream or spray of the liquid/gas through the tube into the surrounding atmosphere due to the significant temperature differential of the tube compared to the cryogenic liquid. The spray can result in frostbite, loss of eyesight or other severe injuries.

Electronic measurement devices do exist. Most are expensive and large and are specifically intended for use with stationary freezers with access to power. Furthermore, most known electronic measurement devices include a measurement probe that is intrusive and introduces continuous added thermal loss due to "heating" into the super-insulated environment. This causes increased consumption in the cryogenic liquid and loss in efficiency of the freezer. Some large freezer systems may include a bulk tank source of cryogenic liquid to maintain the liquid level, but in a small Dewar (e.g., used in a laboratory, hospital, or assembly environment) such a liquid supply is generally impractical, and therefore cryogenic liquid losses due to a permanent probe are particularly problematic. Although cryogenic liquid in a vented Dewar can last weeks to months if outside thermal loss in not introduced, a permanent probe can significantly reduce this time period.

Other non-continuous use measurement instruments exist and are aimed at this market. For example, a super-conducting transducer on a probe that is periodically inserted top-down into the Dewar will provide an indication when the gas/liquid transition level is reached. By noting the insertion length and having prior awareness of the Dewar total depth, the liquid level remaining can be calculated.

Other types of devices that use thermistor sensors may also be used in a similar configuration to indicate the transition point of the top-down liquid/gas transition, also providing the indirect result that requires prior knowledge of the depth of the freezer.

Another option is a capacitive-type coaxial probe device. This also is intrusive, but could be used on a periodic schedule. The disadvantage of a capacitance probe is that it requires the void between the probe "plates" or walls to be submerged into the liquid media being measured. The dielectric of the liquid will proportionally change the total capacitance of the probe, which can be used to determine the portion of the probe that is submerged relative to the remaining portion of the probe that remains filled with air or gas.

A capacitance probe requires the cavity between the tubes to saturate & fill to level. For this to take place, the tubes must be cooled to the same temperature as the liquid media so the liquid can fill the cavity between the 2 tubes (plates). Therefore the capacitance probe must be vented near the top of the probe to allow evacuation of the trapped liquid/gas that occurs when plunging a warm probe into the cryogenic liquid. The vent location must be above the typical measurement area which then requires diversion away from the user handling area of the probe. There is also the time required for liquid level to become stable for measurement. During this duration of time, while venting liquid/gas to the atmosphere, outside heat is being introduced to the cryogenic environment. This time duration significantly reduces the efficiency of the freezer by causing excessive liquid evaporation during the event.

DETAILED DESCRIPTION

Figure 1:
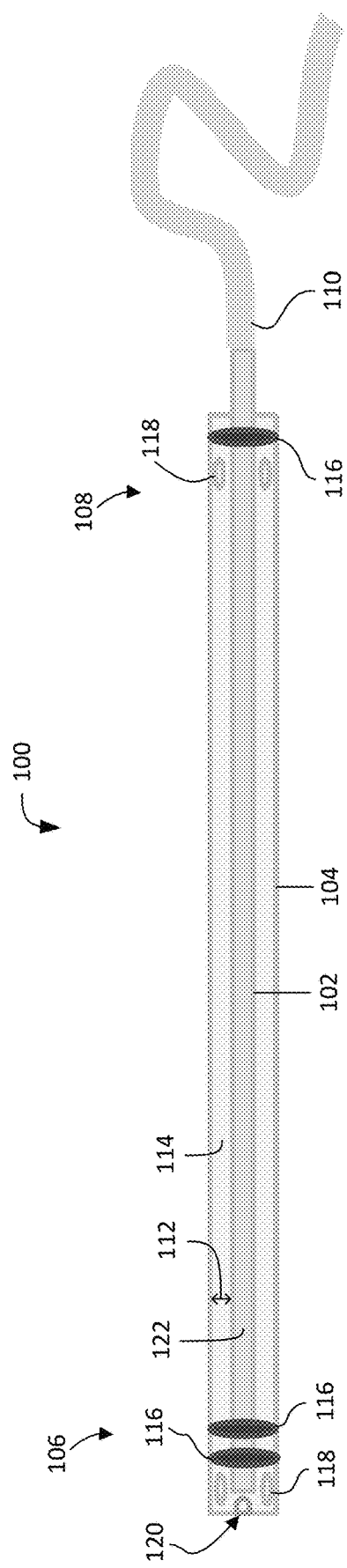
FIG. 1 is a diagrammatic view of an example embodiment of a cryogenic fluid measurement probe.

The present disclosure includes a probe and measurement system for providing an accurate measurement of the liquid level (bottom-up) of a cryogenic liquid. The probe and system may include, in some embodiments, a solid-state electronic pressure sensor as the transducer for the determination of the liquid level. Differential pressure is a well-accepted method, calculated according to equation (1) below:

$$\text{PRESSURE} = \text{HEIGHT} \times \text{DENSITY} \tag{Eq. 1}$$

This technique is utilized in many industries for non-cryogenic liquid level measurement. It is also used in specialized cryogenic tanks and vessels when provisions are made during design and manufacturing for an access port passing through the vacuum insulation space between the inner vessel wall and outer shell, where the vacuum provides the super insulation necessary for thermal efficiency, allowing the liquid to be stored for a useable period. The port passing through the vacuum space isolates the tube from the cryogenic liquid, which insulates the tube such that any liquid that is introduced will quickly convert to gas, expanding and "burping" the tube. This continuing process keeps the tube free from cryogenic liquid and provides a direct measurement of the liquid HEIGHT×DENSITY, resulting in a direct pressure correlation to liquid level.

A probe according to the present disclosure, in certain embodiments, may be coaxial, but may not require liquid/ gas venting or a vacuum insulated shell. The probe may include a port that allows atmospheric air as an insulator between coaxial tubes, but that insulation space may be sealed at its lower end. As a result, there may be no liquid between the probe walls during normal operation of the probe. The probe may comprise any suitable material. In some embodiments, the probe may include one or more of Teflon, Phenolic, Fiberglass, Garolite G10/FR4, stainless steel, aluminum, or any other material appropriate for the cold temperature of cryogenic liquid during temporary submersion.

Using a probe according to the present disclosure, a 5-6 second duration insertion of the probe into a cryogenic liquid can provide a direct pressure measurement of the liquid level according to equation (1). The air space and thermal mass of the probe may perform like a vacuum insulated probe for the short duration required for level measurement. Such short duration submersion may effectively measure the liquid level in a high efficiency Dewar, Cryostat, etc. In addition, the measurement procedure is nearly identical to the standard dipstick method, and the result will be a very accurate level indication with similar efficiency to the conventional dipstick method.

Laboratory testing with a probe according to the instant disclosure has found the peak pressure during measurement remains significantly longer than expected using ambient air as the insulation. If the probe remains submerged, eventually the thermal conductivity of the liquid will cool all the probe surfaces, equaling the temperature of the liquid. As that occurs, the pressure expectedly will drop as liquid enters the inner probe cavity, contracting the air/gas as temperatures cool and equalize. This is expected and not detrimental to the process or method, as the technique is to mimic the dipstick is procedure and technique. Typically the intention is to dip/remove the probe so not to introduce outside heat, causing thermal losses. Electronics can capture the peak pressure and quickly store the result, thus making the loss of pressure transparent if the probe was left in the vessel. An electronic timer/warning can inform the user when to remove the probe once the data is captured, if unfamiliar with the standard dipstick method.

With a conventional dipstick, the procedure for measurement of multiple Dewar tanks is to allow the dipstick to warm prior to attempting the next measurement. This is necessary for the temperature of the thermal mass to warm enough to accurately measure the next vessel. If the procedure is not followed, an error may be introduced due to the dipstick being cold above the level of the next tank measured, providing an error in the visible frost line. The instant disclosure overcomes this shortcoming of a standard dipstick measurement. An electronic dipstick according to the present disclosure may be used for a further measurement after only a wipe of the probe, having much less thermal mass than the wood or composite standard dipstick, which results in less time waiting between measurements when checking multiple tanks.

Referring to the drawings, wherein like numerals refer to the same or similar features in the various views, FIG. 1 is a diagrammatic view of an example probe 100 for measuring a cryogenic liquid level. The probe may include a coaxial tubular construction that includes a cylindrical inner tube 102 and a cylindrical outer tube 104 defining a distal end portion 106 and a proximal end portion 108. A central longitudinal axis (lustrated as axis A in FIG. 3) may extend through both the inner tube 102 and the other tube 104. The outer tube 104 may be disposed radially outside of and around the inner tube 102. The coaxial tubular construction may provide a path for the inner tube to convey the liquid level pressure differential to a transducer (not illustrated in FIG. 1), which may be directly coupled to the inner tube 102, or may be coupled to the inner tube 102 through a pressure conduit 110 (e.g., a flexible pressure tube), or may otherwise be in pressure communication with the inner tube. The pressure conduit 110 may be made from TYGON, silicone, vinyl, and/or another appropriate material, in embodiments.

The outer tube 104 may be separated from the inner tube 102 by a radial gap 112, which radial gap may be open to the ambient atmosphere, and thus air-filled so as to form an airgap 114 between the tubes 102, 104. The probe may further include one or more gaskets 116, such as o-rings or a silicone or other tubular seal, positioned between the inner tube 102 and outer tube 104 so as to fluidly isolate the airgap 114 from cryogenic fluid being measured by the probe 100. In the embodiment illustrated in FIG. 1, three o-rings 116 are provided; two o-rings 116 are provided at the distal end portion 106 of the probe 100, and one o-ring 116 is provided at the proximal end portion 108 of the probe 100.

The outer tube 104 may be hollow and open at its distal end. Accordingly, the outer tube 104 may define or otherwise include a proximally-extending aperture 120 in the distal tip of the outer tube 104 through which the inner tube 102 may be exposed to cryogenic fluid when the distal end portion 106 is inserted into cryogenic fluid.

The inner tube 102 may also be hollow and open at its distal end. Accordingly, the inner tube 102 may define or otherwise include a proximally extending aperture 122 in the distal tip of the inner tube 102 into which cryogenic fluid may enter when the distal end portion 106 is inserted into cryogenic fluid. The aperture 122 may be continuous with the aperture 120.

The outer tube 104 may include one or more apertures 118 at the distal end portion 106, which apertures 118 at the distal end portion 106 may be connected to the aperture 120. The apertures 118 may be defined in the sidewall of the outer tube 104. In addition to or instead of apertures 118 at the distal end portion, the outer tube 104 may include one or more notches or other formations. The apertures 118 and/or notches at the distal end portion 106 may be provided to reduce any trappings or plugging from frozen sediment that may accumulate at the bottom of the cryogenic vessel in which the probe 100 is used. The one or more adjacent holes, notches, or side apertures 118 may additionally or alternatively be provided to reduce sealing of the opening when plunged tight against the vessel bottom, which would prevent an accurate pressure measurement if probe was bottomed out squarely. If permitted, such plugging may affect the pressure measurement using the probe 100.

One or more apertures 118 in the outer tube 104 may also be provided at the proximal end portion 108 for permitting exposure of the air gap 114 to the ambient atmospheric air and pressure. Accordingly, the airgap 114 may be vented to atmosphere through one or more apertures 118. The airgap 114 may serve as a thermal barrier between the inner tube 102 and outer-tube 104.

The configuration of the probe 100 may provide a low-cost, lightweight, and effective device for cryogenic fluid level measurement. The air gap 114 thermal barrier may cause gasification and cryogenic liquid boil-off inside the inner tube. The pressure accumulated is the resultant differential pressure of the liquid level.

Figure 2:
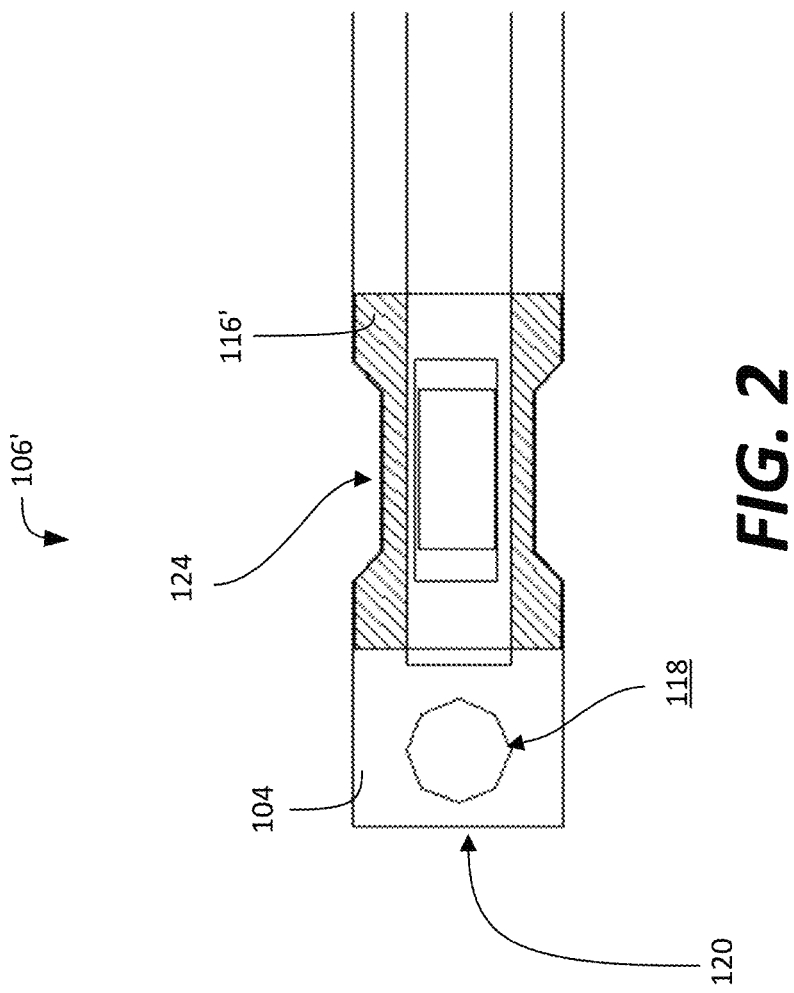
FIG. 2 is a diagrammatic view of a distal end portion of an example cryogenic fluid measurement probe.

FIG. 2 is a diagrammatic view of a distal end portion 106' of an example probe 100'. The example probe 100' may be identical to the probe 100 except as explicitly described below. As noted above, a gasket material that may be used between the inner tube 102 and the outer tube 104 may be a silicone or other tubular seal; FIG. 2 illustrates an example of such a tubular gasket 116'. In such an embodiment, the outer tube 104 may be crimped during construction to compress and the outer tube and compress the flexible tube used as a gasket, thereby forming an air-tight seal between the inner tube 102, gasket 116', and outer tube 104. In such an embodiment, the flexible tube gasket 116' may have a length that is greater than the crimp, such that the flexible tube gasket 116' extends from a point distal of the crimp, through the crimp, to a point proximal of the crimp. As a result, the outer tube 104 of the probe 100' may include a reduced diameter or crimped portion 124 where the crimp was applied.

Figure 3:
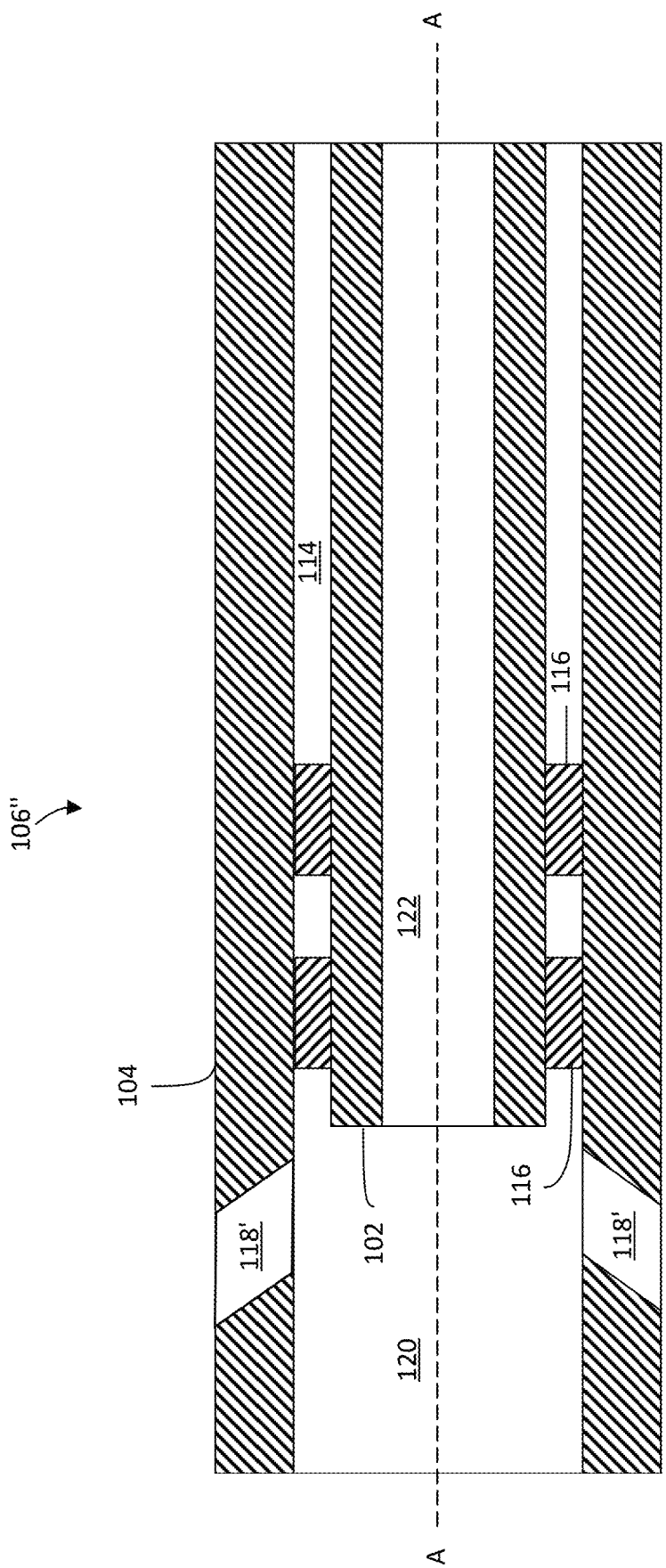
FIG. 3 is a cross-sectional view of a distal end portion of an example embodiment of a cryogenic fluid measurement probe.

FIG. 3 is a cross-sectional view of an example distal end portion 106" of an example probe. As illustrated in FIG. 3, the aperture 120 of the outer tube 104 may be continuous with the aperture 122 of the inner tube 102, such that cryogenic fluid may enter the inner tube 102 through the apertures 120, 122. Cryogenic fluid may be prevented from entering the airgap 114 by one or more gaskets 116 (two such annular gaskets 116 are shown in FIG. 3) disposed between the outer tube 104 and the inner tube 102 to form a fluid-tight seal. The inner tube 102 and outer tube 104 may be radially symmetrical about a common axis A, and the apertures 120, 122 may be along or otherwise parallel with the axis A. The outer tube 104 may include one or more transverse apertures 118' defined in the sidewall of the outer tube 104. The outer tube 104 may extend further in the distal direction (left in the view of FIG. 3) than does the inner tube 102. That is, the distal end of the outer tube 104 may be longitudinally offset from the inner tube 102. The longitudinal offset distance may be selected so as to minimize the risk that the inner tube 102 will become plugged with sediment that has accumulated at the bottom of the freezer or Dewar when the probe 100 is placed in contact with the bottom of the freezer or Dewar. Whatever the longitudinal offset distance, it must be known and accounted for in order to properly convert the pressure sensed with the inner tube 102 into a fluid depth value.

Figure 5:
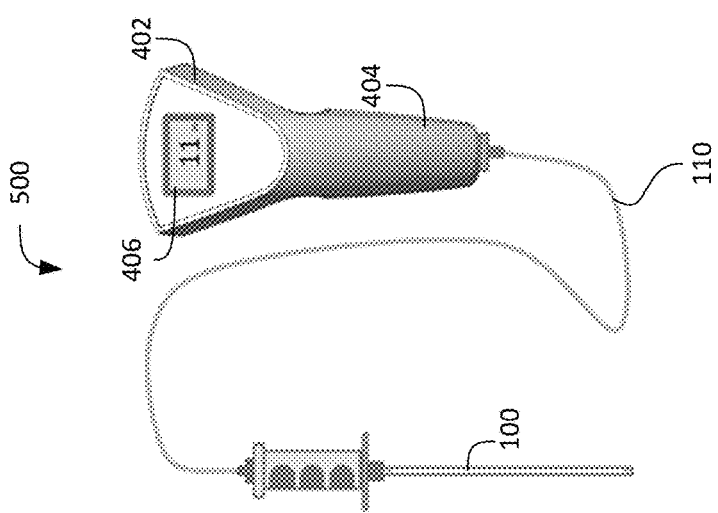
FIG. 5 is a diagrammatic view of an example embodiment of a cryogenic fluid measurement probe and display.
Figure 4:
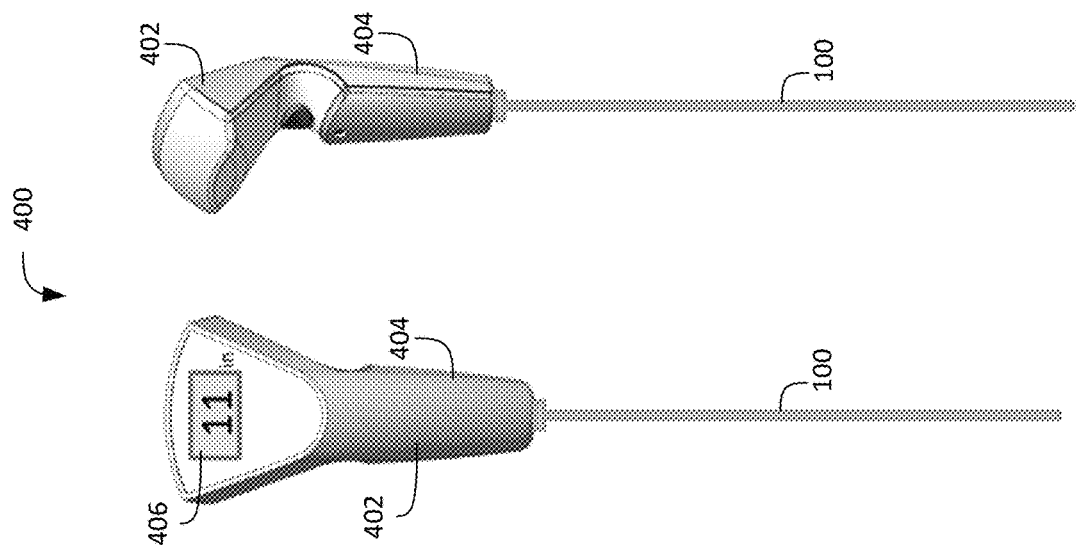
FIG. 4 is a diagrammatic view of an example embodiment of a cryogenic fluid measurement probe and display.

FIGS. 4 and 5 are diagrammatic views of embodiments 400, 500 of a handheld probe measurement device according to the present disclosure. Both devices 400, 500 include a probe 100 (which may be, in embodiments, probe 100') and a body 202. Devices 400, 500 are identical to each other, except the body 402 of the device 400 is directly coupled with the probe 100, whereas the body 402 of the device 500 is coupled to the probe with a pressure conduit 110.

The body 402 may include a housing 404, a display 406, and a button 408 or other switching mechanism. The housing 404 may store one or more transducers and other electronics, as will be described with respect to FIG. 6. The display 406 may be any appropriate type of display, such as an LCD. The button 408 may be electrically coupled with one or more electronic components of the device 400, 500 to initiate a pressure measurement.

Figure 6:
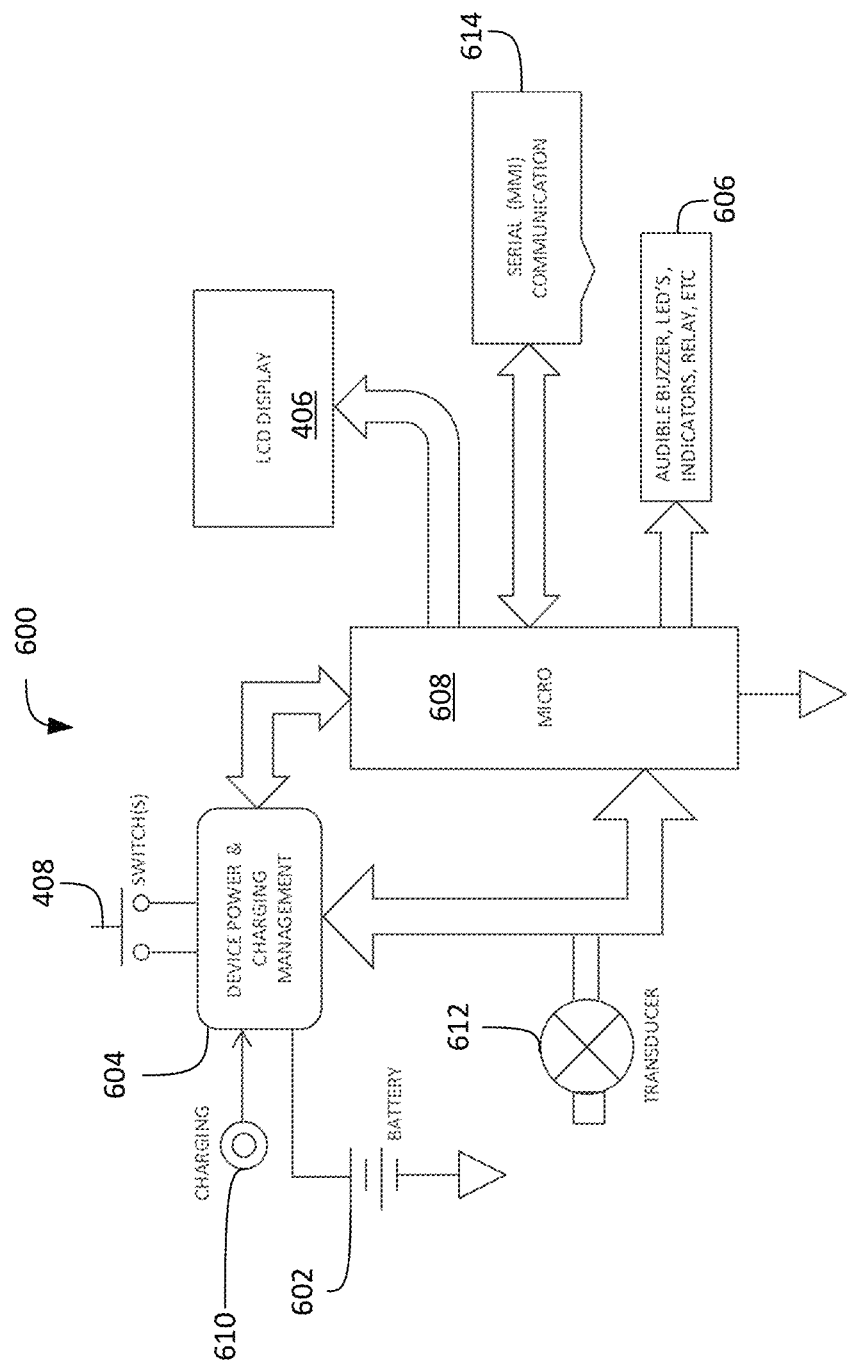
FIG. 6 is a block diagram view of a measurement, control, and display circuit for a cryogenic fluid measurement probe.

FIG. 6 is a block diagram view of an example measurement, control, and display circuit 600 for a measurement probe device. The circuit 600 may disposed in a housing 404 of a device 400, 500, in some embodiments. The circuit may include a battery 602 of an appropriate construction and/or chemistry. For example, the battery may be an alkaline, Li-ion, lithium polymer, or other rechargeable or non-rechargeable battery type. The circuit 600 may further include a device power and charging management sub-circuit 604 that may control the power to the circuit 600. For example, the power and charging management sub-circuit 604 may provide power to the circuit in response to user actuation of the button or other switch 408. The switch 408 may be in electronic communication with both the power management sub-circuit 604 and a microcontroller 608 or other processor.

The microcontroller 608 and device power and charging management sub-circuit 604 may execute one or more control strategies responsive to user actuation of the switch 408. For example, in response to a long press hold of the switch 408, the device power and charging management sub-circuit 604 may activate or deactivate power to the circuit 600 (i.e., turn the device on or off). In response to a short press of the switch 408, or combinations of multiple switches 408, if provided, the microcontroller may cycle through various measurement and diagnostic modes, such as battery level check, diagnostic check, fluid type selection, settings changes, or measurement. In each mode, the microcontroller may provide an appropriate output on the display 406. For example, in measurement mode, the microcontroller 608 may provide an output of a measured pressure or depth. In battery level check mode, the microcontroller 608 may provide a percentage of battery life remaining on the display 406. In fluid type selection mode, the microcontroller 608 may provide a menu of available fluid types from which a user may select, a range of fluid densities from which a user may select, or may receive an entry of a fluid density from the user.

In addition to or instead of the display 406, the microcontroller 608 may be configured to provide output through one or more other output devices 606, such as one or more buzzers or other audible outputs, LEDs or other light sources, other visible indicators, relays, and the like. Such output may provide feedback on the condition or status of the device or measurement.

The circuit 600 may include one or more connectors 610 for battery recharging. For example, the connectors 610 may provide an electrical connection between the battery and a wall mount station with charging provision for use when the device is stored or not in use.

The microcontroller 608 may be a highly efficient (low-power) microcontroller configured to be programmed to perform all the necessary tasks for measurement, diagnostics, timers, alarm indications, and the other functions of the device. The microcontroller 608 may be configured to execute one or more software routines, such as a software timer that may count down elapsed time and power down the device after X duration to conserve battery or simply place the unit into a high efficient sleep-mode for storage or non-use. The timer may also be utilized to instruct the user when to remove the probe 100 from the freezer during a measurement. The microcontroller 608 may include hardware and/or software for carrying out the functionality of the microcontroller 608 of this disclosure. In some embodiments, the microcontroller may include a processor and a non-volatile, computer-readable memory containing instructions that, when executed by the processor, cause the processor to perform the functionality of the microcontroller 508 of this disclosure.

The circuit 600 may further include a pressure transducer 612 which may determine a pressure in the inner tube of a probe. The transducer 612 may be a solid-state transducer, in some embodiments. The transducer may have a 0-1 psi or greater capacity; 1-psi will display 33" of Liquid Nitrogen, assuming the density of Liquid Nitrogen being ~804 mg/cm$^3$. The 1-psi scale transducer will work to replace most conventional dip-sticks for Dewar and laboratory applications. A 1-psi transducer will also measure water to 27.6"=1-psi (Water at 4*C gauge). Other scale transducers could be used for other applications.

The transducer 612 may include or may be associated with one or more filtering, conditioning, and other signal processing components in the circuit 600. Accordingly, the signal created by the transducer may be filtered and conditioned and transmitted to the microcontroller 608 through serial, analog, or other signal processing. The microcontroller 608 may analyze the signal to determine the pressure. The microcontroller 608 may further be configured to provide output to the user, such as by providing the pressure measurement on the display, or output through a buzzer, indicator, relay, etc., as described above. The microcontroller 608 may be configured to provide an output indication of when a measurement is completed (e.g., through a buzz, beep, or other sound, a flashing light, an output number on the display, etc.), as well as output of the measurement itself.

The microcontroller 608 may further be configured for MMI (machine-machine-interface) communication over a serial link 614 or other communications channel, in some embodiments, in which the microcontroller communicates with a separate controller, workstation, etc. to transmit measurement data for storage and permanent record keeping. The microcontroller 608 may include a real-time clock and may provide time-stamped data, for permanent record storage to aid in FDA 21 CFR Part 11 compliance, for those companies who use electronic systems for document and signature control must provide assurance that the electronic documents are authentic. The MMI communication link 614 may be Bluetooth, RF, WiFi, IR link, etc. for interface to a computer, tablet, PLC or other interface device. Settings and parameters can be configured specific units (inch/metric), and time (military or standard) as per user configuration.

Referring to FIGS. 4-6, in operation, a user may initiate a measurement by activating the device 400, 500 by actuating the button 408 (shown in FIG. 6 as the switch 408). In some embodiments, the user may place the device 400, 500 into measurement mode and select the proper type of cryogenic fluid or fluid density by further actuating the button 408. The user may then dip the probe 100 into the liquid storage vessel and touch the distal tip of the probe 100 to the bottom of the vessel, which may cause the cryogenic fluid in the vessel to travel into and up (in a proximal direction) the probe 100, such as up an inner tube 102 of the probe. The microcontroller 608 may be configured to read an output from the transducer 612 and, once a stable pressure or depth measurement is computed, output an indication to the user that the measurement is complete and/or the numerical result of the measurement. The user may then remove the probe 100 from the vessel and can review the result of the measurement on the display 406. The microcontroller 608 may be configured to maintain the measurement output on the display 406 until the user manipulates the switch to clear the measurement, prepare for another measurement, store/output data or shut down for storage.

Figure 7:
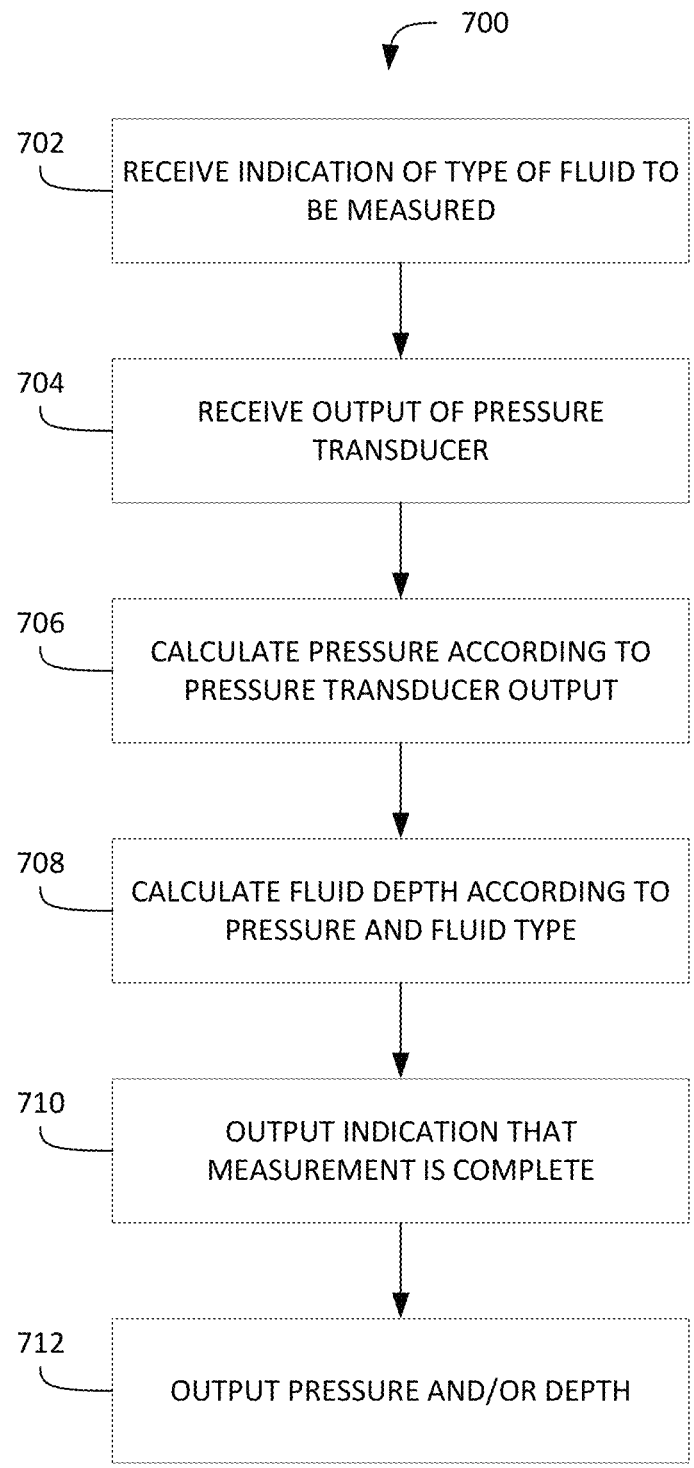
FIG. 7 is a flow chart illustrating an example method of providing a pressure or depth measurement.

FIG. 7 is a flow chart illustrating an example method 700 of providing a pressure or depth measurement. The method 700, or one or more portions thereof, may be performed by the microcontroller 608, in some embodiments.

The method 700 may include, at block 702, receiving an indication of a type of fluid to be measured. The indication may be received, for example, by a user cycling through fluid type options by sequentially pressing the button/switch 408. In response to each press, a fluid type may be output (e.g., displayed), and the last fluid type output before measurement may be considered indicated by the user. In another example, the fluid type may be received by a user selection from a displayed menu. In another example, a fluid type may be received via user entry of a fluid density. Other methods of a user indicating a fluid type are possible and within the scope of this disclosure.

The method 700 may further include, at block 704, receiving an output of a pressure transducer. Receiving a pressure transducer output may include, for example, receiving a continuous output of the pressure transducer. In other embodiments, receiving a pressure transducer output may include receiving a discrete transducer output (e.g., when the pressure value output has stabilized). Receiving the pressure transducer output may include polling the pressure transducer output when in a measurement mode, in some embodiments.

The method 700 may further include, at block 706, calculating a pressure according to the pressure transducer output. Calculating the pressure may include, for example, comparing the output of the pressure transducer to a reference pressure. The reference pressure may be, in some embodiments, atmospheric pressure.

The method 700 may further include, at block 708, calculating a fluid depth according to the calculated pressure and the indicated fluid type. The fluid depth may be calculated according to equation (1). In some embodiments, calculating a fluid depth may include subtracting a longitudinal offset from the distance calculated according to equation (1) to account for a longitudinal offset between an outer tube of the probe and an inner tube of the probe.

The method 700 may further include, at block 710, outputting an indication that the measurement is complete. Such output may include, for example, a beep, buzz, or other audible output, or a light or display output.

The method 700 may further include, at block 712, outputting the measured pressure or calculated depth. The pressure or depth output may be on a display, for example. The display may be integrated with the measurement device, in some embodiments.

Measurement with a probe according to the instant disclosure provides numerous advantages over known fluid depth measurement devices and techniques. Because the probe can quickly determine pressure, the probe only needs to be submerged for a brief period of time (e.g., a few seconds), and thus a simple air-gap insulation barrier is sufficient for the probe to maintain its thermal heat long enough to capture the pressure differential of the liquid level. Further, the brief measurement period minimizes fluid loss in the Dewar or freezer. The air-gap insulator probe design can maintain the resultant liquid level differential pressure beyond 30 seconds before temperature equalization causes pressure collapse, in some embodiments. A brief warm up to room temperature restores effectiveness if the probe is submerged to cool for too long. With similar procedure of 5 second submerge, capture value, remove, document, multiple tanks can be accurately measured in a short amount of time, with the room temperature warming being enough to restore the thermal heat load enough overcome the cooling of the next submersion/measurement.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A device for measuring a cryogenic liquid level, the device comprising:
   an inner cylindrical tube;
   an outer cylindrical tube disposed around the inner cylindrical tube, the outer tube separated from the inner tube by an air gap, wherein the air gap is exposed to atmospheric pressure and sealed at a distal end of the air gap against cryogenic liquid;
   a pressure transducer in pressure communication with the inner tube; and
   a user interface that instructs a user to remove the device from cryogenic fluid when a measurement is complete.

2. The device of claim 1, wherein the outer tube defines one or more apertures for exposing the air gap to atmospheric pressure.

3. The device of claim 2, wherein the outer tube comprises a distal end portion configured to be inserted into cryogenic liquid and a proximal end portion, wherein the one or more apertures are defined in the proximal end portion.

4. The device of claim 1, wherein the outer tube and inner tube comprise respective distal end portions configured to be inserted into cryogenic liquid, wherein the outer tube extends further in the distal direction than does the inner tube.

5. The device of claim 4, wherein the outer tube and the inner tube include respective apertures at their respective distal ends, such that cryogenic liquid may enter the inner tube through the apertures.

6. The device of claim 4, further comprising:
   one or more gaskets disposed in the air gap at the distal end portion of the outer tube; or
   a crimp in the distal end portion of the outer tube.

7. The device of claim 4, further comprising:
   a gasket disposed in the air gap at the distal end portion of the outer tube; and
   a crimp in the distal end portion of the outer tube, wherein the crimp is axially aligned with the gasket.

8. The device of claim 4, wherein the outer tube defines a first aperture in a distal tip of the outer tube and a second aperture in a sidewall of the distal end portion of the outer tube.

9. A device for measuring a cryogenic liquid level, the device comprising:
   a probe comprising:
      an inner cylindrical tube; and
      an outer cylindrical tube that is coaxial with the inner cylindrical tube, the outer tube separated from the inner tube by an air gap, wherein the air gap is exposed to atmospheric pressure and sealed against cryogenic liquid;
   a body coupled with the probe, the body comprising a display;
   a pressure transducer in pressure communication with the inner tube; and
   a processor in electronic communication with the pressure transducer and the display, the processor configured to cause the display to output:
      a cryogenic fluid depth responsive to an output of the pressure transducer; and
      an alert to the user to remove the probe from the cryogenic fluid when the output of the pressure transducer has been captured.

10. The device of claim 9, wherein the processor and the pressure transducer are disposed within the body.

11. The device of claim 9, wherein the body is coupled to the probe with a pressure conduit.

12. The device of claim 9, wherein the outer tube defines one or more apertures for exposing the air gap to atmospheric pressure.

13. The device of claim 12, wherein the outer tube comprises a distal end portion configured to be inserted into cryogenic liquid and a proximal end portion, wherein the one or more apertures are defined in the proximal end portion.

14. The device of claim 9, wherein the outer tube and the inner tube include respective apertures at their respective distal ends, such that cryogenic liquid may enter the inner tube through the apertures.

15. The device of claim 14, further comprising:
one or more gaskets disposed in the air gap at the distal end portion of the outer tube; or
a crimp in the distal end portion of the outer tube.

16. The device of claim 14, further comprising:
a gasket disposed in the air gap at the distal end portion of the outer tube; and
a crimp in the distal end portion of the outer tube, wherein the crimp is axially aligned with the gasket.

17. The device of claim 9, wherein the outer tube defines a first aperture in a distal tip of the outer tube and a second aperture in a sidewall of the distal end portion of the outer tube.

18. The device of claim 9, wherein the outer tube comprises a distal end portion configured to be inserted into cryogenic liquid, wherein the outer tube extends further in the distal direction than does the inner tube.

19. The device of claim 18, wherein the outer tube and the inner tube include respective apertures at their respective distal ends, such that cryogenic liquid may enter the inner tube through the apertures.

20. A device for measuring a cryogenic liquid level, the device comprising:
a probe comprising:
an inner cylindrical tube; and
an outer cylindrical tube that is coaxial with the inner cylindrical tube, the outer tube separated from the inner tube by an air gap, wherein the air gap is exposed to environmental pressure but sealed against cryogenic liquid;
a pressure transducer in pressure communication with the inner tube; and
a processor in electronic communication with the pressure transducer and a display, the processor configured to:
cause the display to output a cryogenic fluid depth responsive to an output of the pressure transducer; and
operate a timer to determine when a measurement is complete and, in response, cause the display to output an instruction to the user to remove the probe from the cryogenic fluid.

\* \* \* \* \*